United States Patent [19]
Plattner et al.

[11] 3,960,352
[45] June 1, 1976

[54] LEG ASSEMBLIES FOR CABINETS

[75] Inventors: Robert F. Plattner, Spring Lake; Raymond J. Arend; John A. Verberkmoes, both of Grand Haven, all of Mich.

[73] Assignee: Bastian-Blessing, Grand Haven, Mich.

[22] Filed: June 10, 1974

[21] Appl. No.: 477,618

[52] U.S. Cl. ............................ 248/188; 248/188.4; 312/256
[51] Int. Cl.² ............................ F16M 13/00
[58] Field of Search ............ 248/188, 151, 68, 72, 248/228, 188.4; 312/256; 5/309; 403/230, 187, 8, 367

[56] References Cited
UNITED STATES PATENTS

| | | | |
|---|---|---|---|
| 1,273,088 | 7/1918 | Null | 248/188 |
| 1,800,132 | 4/1931 | Brubaker | 248/188 |
| 3,159,438 | 12/1964 | Carlson et al. | 312/256 |
| 3,333,799 | 8/1967 | Peterson | 248/72 |
| 3,383,079 | 5/1968 | Constantini et al. | 248/188.4 |

FOREIGN PATENTS OR APPLICATIONS
194,890  9/1964  Sweden ........................ 248/72

*Primary Examiner*—Roy D. Frazier
*Assistant Examiner*—Darrell Marquette
*Attorney, Agent, or Firm*—Watson D. Harbaugh

[57] ABSTRACT

The cabinets are equipped with elongated three-sided, flanged or webbed channels, opening downward and extending along a bottom edge. A plurality of detachable leg assemblies, having extendable feet is provided which have top plates that fit into the channels in an interlocking and mating arrangement. Holding means for each leg comprise set screws or the like that impinge against one flange of the channel and force the opposite edge or flange of the plate into the corner defined by the other flange of the channel. The legs can be inserted at intermediate or end positions along the channels at desired positions without the necessity of insertion into the open ends and sliding them longitudinally of the channels for proper placement. A modified telescoping leg assembly is also disclosed.

4 Claims, 11 Drawing Figures

U.S. Patent   June 1, 1976   3,960,352
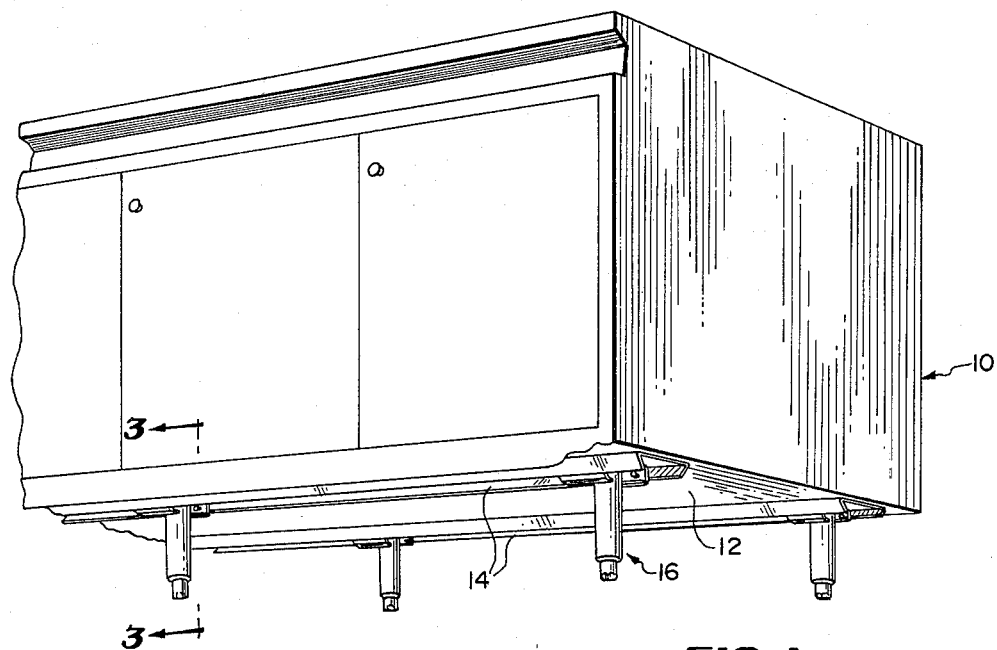
FIG. 1
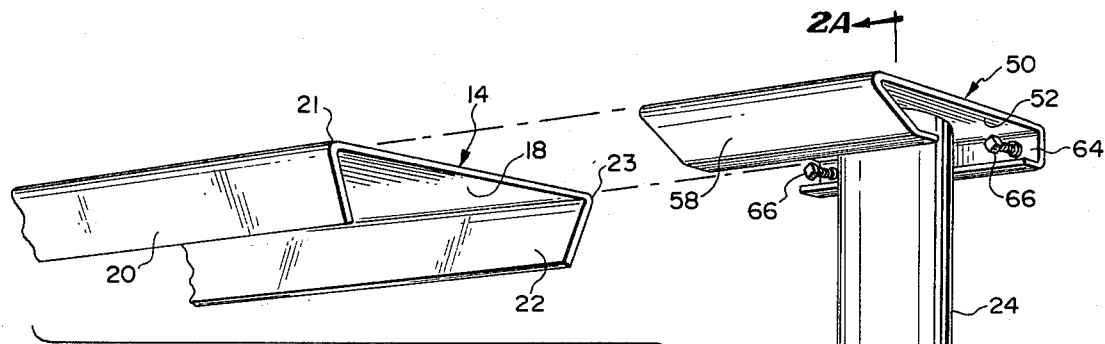
FIG. 2
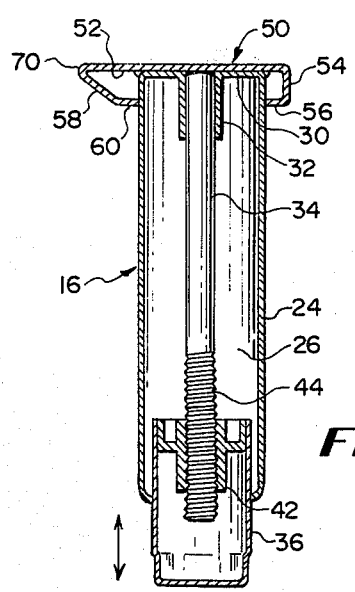
FIG. 2A
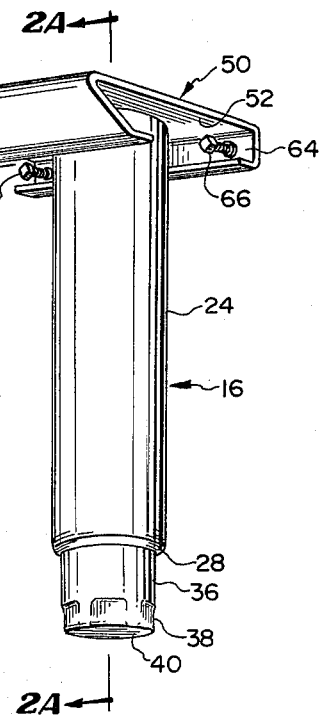

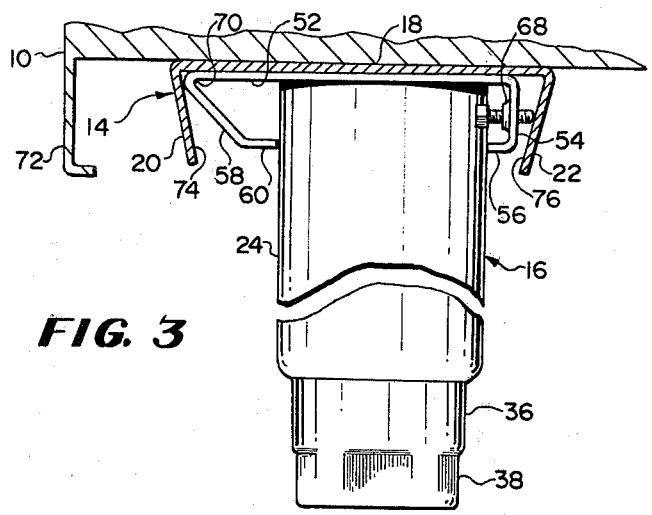
FIG. 3
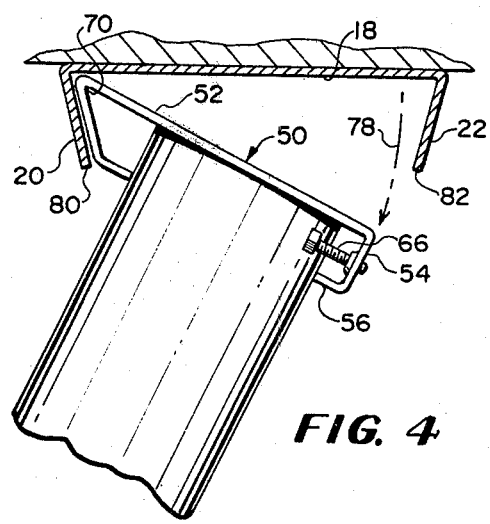
FIG. 4
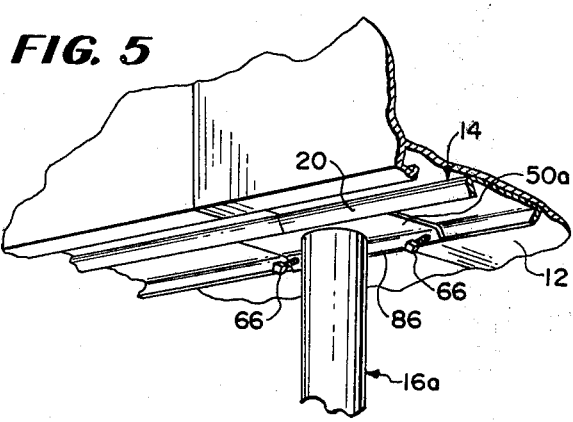
FIG. 5
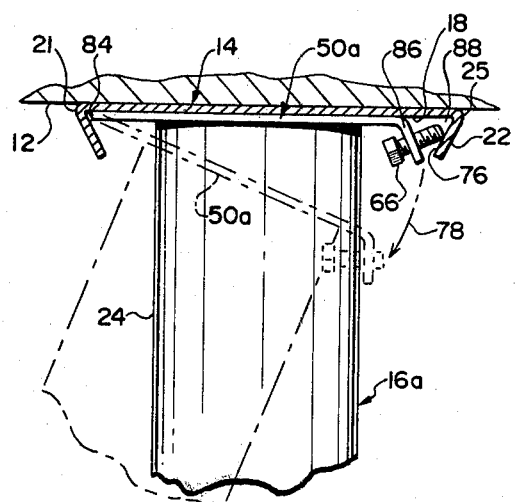
FIG. 6
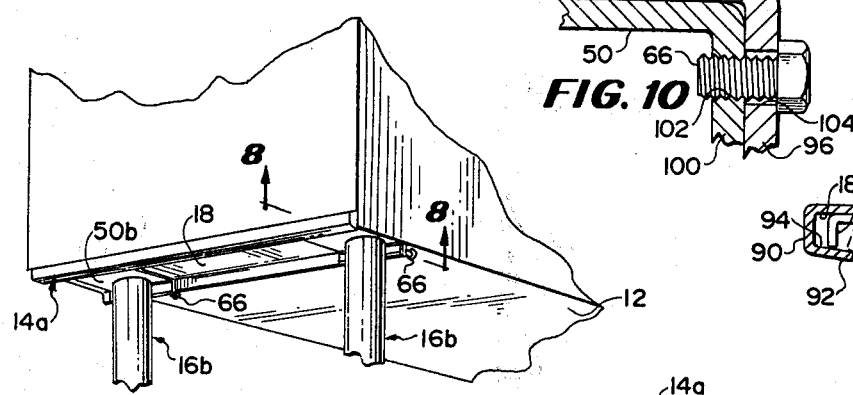
FIG. 7
FIG. 10
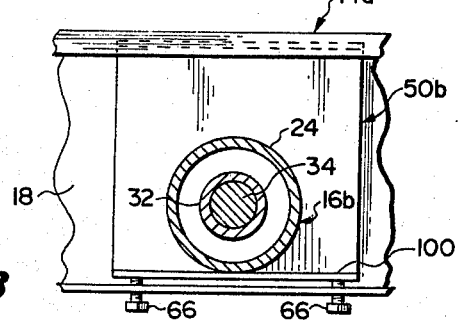
FIG. 8
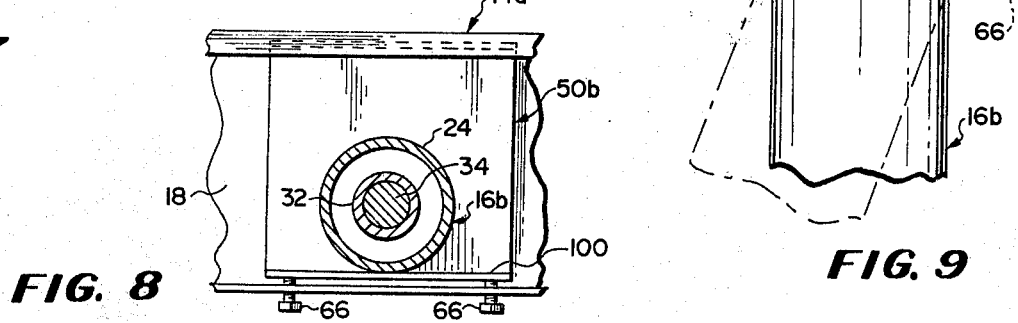
FIG. 9

LEG ASSEMBLIES FOR CABINETS

BACKGROUND OF THE INVENTION

The Carlson et al. U.S. Pat. No. 3,159,438 owned by the instant assignee is concerned with means to connect cabinets in end-to-end relationship. The patent describes cabinet structures having a plurality of adjustable leg members with top plates slidably received in channel members secured to the underside of the cabinets. The long channels and the top plates have inwardly directed flanges on both sides and the top plates on the legs conform in all directions to the internal space defined by the long channels. The inwardly directed flanges of the long channels and top plates interfere with easy access to the set screws, narrow the space for the set screws and require insertion of the top plates of the legs into the open ends of the long channels. Although each leg can be positioned at any desired location along the long channels the parts must be brought together at the end openings of the long channels and cannot be inserted or removed in any other fashion. Also the legs depend upon the threaded engagement of a base with a rotatable spindle or rod such that the area of engagement lessens as the spindle is extended, lending instability to the parts unless fabricated with close telescoping tolerances. Also, the base part of the leg is affixed by an external set screw only.

SUMMARY OF THE INVENTION

This invention represents an improvement over the leg assemblies of the above patent wherein the openings of the bottom channels are enlarged, at least one of the inwardly directed flanges is eliminated, the structure of the top plates of the legs is simplified and the legs can be seated into the channels by a swing or pivot action from the sides and do not have to be slid into the open ends of the long channels. Furthermore, the structure of the legs has been altered so that over the main portion of their adjustment full threaded engagement of the parts is insured for greater strength and stability. The set screws are easily accessible and either external or internal set screws can be used for the assembly. Not only is the assembly of this invention more easily fabricated, it is more easily affixed to the cabinet bottom with fewer parts.

DESCRIPTION OF THE DRAWINGS

Illustrative embodiments of the invention are shown in the drawings wherein:

FIG. 1 is a front, fragmentary perspective view of a cabinet showing four leg assemblies along the bottom thereof;

FIG. 2 is an exploded view of a bottom channel and one leg assembly;

FIG. 2A is a longitudinal partial cross-sectional view along the center lines 2A—2A of the leg assembly of FIG. 2;

FIG. 3 is a fragmentary, partial cross-sectional view along the lines 3—3 of FIG. 1 showing one form of top plate of a leg in place within a bottom channel;

FIG. 4 is a fragmentary, partial cross-sectional view like FIG. 3 showing the removal or placement of the leg assembly therein;

FIG. 5 is a fragmentary view of the under portion of the cabinet with a modified form of top plate for a leg affixed therein;

FIG. 6 is an enlarged fragmentary cross-sectional view of the embodiment shown in FIG. 5 showing in broken lines the position of the leg assembly upon removal or placement therein;

FIG. 7 is a fragmentary perspective view of the underside and end of a cabinet with a pair of leg assemblies affixed to the bottom channel using a modified form of top plate for the leg assemblies;

FIG. 8 is a cross-sectional view along the lines 8—8 of FIG. 8; and

FIG. 9 is a fragmentary, partial cross-sectional view of the embodiment shown in FIG. 7; and FIG. 10 is a fragmentary cross-sectional view of another form of attachment contemplated by the invention.

DESCRIPTION OF THE PREFERRED EMBODIMENT

Referring to the drawings, FIG. 1 shows the cabinet 10, which can be any type of cabinet such as food service equipment, a soda foundain, a freezer or a display cabinet. Such cabinets have bottom walls 12 to which are attached the elongated channels 14 for the purpose of receiving the leg assemblies 16 in desired spaced locations, generally along the front and back edges of the cabinet.

FIGS. 2 and 2A show the elongated channel 14 in more detail to include the top plate 18, the front flange 20 and the rear flange 22, along with details of one leg assembly. The front and rear flanges define substantially oblique internal corners 21 and 23 therealong. The channels 14 are continuous from one end of a cabinet to another or may extend under several cabinets fastened end-to-end as desired. They are spaced front to rear sufficiently to give the greatest stability in supporting the cabinet upon the leg assemblies.

The leg assembly 16 includes the outer tubular leg member 24 defining the internal bore 26 (see FIG. 2A) and having the crimped edge 28 at the bottom end. The top plate 30 is welded or otherwise permanently affixed to the top end of the tubular leg member 24 and closes off the end of the leg. A socket 32 may be provided, in one embodiment, central of the plate 30 to receive the top end of the threaded spindle 34. The socket 32 may be welded to the end of the spindle 34 or otherwise permanently affixed so that one part cannot rotate or move in relation to the other.

The adjustable foot member 36 has the hexagonally placed compressions 38 about the bottom edge to receive a wrench for adjustment of floor to cabinet height. The foot member 36 is tubular and enclosed by the bottom wall 40. The open top receives the threaded adapter 42 which engages the threaded section 44 of the spindle 34. The adapter 42 is elongated so that it engages a substantial portion of the spindle at substantially all of its adjusted positions.

The top plate 50 is affixed, as by welding, to the top plate 30 and extends in a rectangular configuraton thereover, being about three to four times the area of the leg 24. This plate includes the flat top wall 52 and a rear web construction comprising the rear flange 54 with the inturned edge 56. On the front side of the plate 50 there is provided a front web construction comprising the oblique flange 58 with the inturned edge 60. The abuttments of the edges 56 and 60 with the periphery of the leg 24 can also be welded.

The long cabinet channels 14 and the plates 50 are made of 12 gauge galvanized steel, or the equivalent, since the cabinets to be supported are quite heavy. The legs 24 and the foot member 36 are made of stainless steel for appearance and resistance against rust and the like.

The flange 54 is drilled and tapped at spaced locations, each near the end edges 64 to receive the pair of set screws 66 which are square headed and have cup points. The tapped holes can be punched in which event a burr 68 (FIG. 3) is formed which is readily tapped to adjustably receive these set screws. Hexhead self tapping cap screws can be used.

The front web construction 58–60 of the plate 50 defines an oblique outer corner 70 and the rear web construction 54–56 of the plate 50 defines a square corner.

In FIG. 3 the general relationship of the bottom front of the cabinet 10, its trim flange 72 with the elongated channel 14 off-set therealong is shown. The leg assembly 16 is shown with the oblique outer corner 70 of the plate 50 wedged into the oblique inner corner 21 of the channel 14. The square corner defined by the flanges 54 and 56 is within, but spaced from, the oblique inner corner 23 on the other side of the channel 14. It is seen that this construction provides two camming surfaces 74 and 76 inclined away from each other which raise the plate 50 so that the wall 52 is flush against the wall 18 as the set screw 66 is turned against the latter cam surface 76. Once tightened the leg assembly 16 becomes practically integral with the elongated channel 14, and cannot be dislodged or tilted during ordinary use or movement of the cabinet.

With the set screw 66 retracted, as in FIG. 4, it is seen how the plate 50 is either pivoted into position or removed with the oblique corners 70 and 21 in close proximity as a pivot axis as the rear of the leg assembly is moved in the arc indicated by the arrow 78. The width of the plate 50 from the oblique outer corner 70 to the flange 54 is preferably slightly greater than the transverse opening or distance between the edges 80 and 82 of the flanges 20 and 22. Once in place, the leg assemblies 16 will hang between the flanges 20 and 22 and can be slid longitudinally into the desired positions, before the tightening of the set screws 66. Since the channel 14 is symmetrical, the leg assembly can be installed in the reverse of the position shown in FIGS. 3 and 4.

In the embodiment shown in FIGS. 5 and 6, the leg assembly 16a is modified by the inclusion of the top plate 50a having the straight edge 84 replacing the outer corner 70 but nevertheless functioning to engage within the oblique inner corner 21. The other edge of the plate 50a is also modified to include the angled flange 86 carrying the set screws 66 so that the points 88 impinge upon the cam surface 76 of the oblique inner corner 25 and the camming action of the screws 66 on the flange 22 raises and tightens the plate 50a against the wall 18. The plates 50a can be made of 7 gauge galvanized steel.

The angle of the flange 86 can be lessened so that the screw 66 seats in the oblique inner corner 23 in its fully tightened position. Arrow 78 again shows the swing angle of removal or placement of the assembly. The leg assembly 16a can be reversed from that shown in FIGS. 5 and 6.

FIGS. 7, 8 and 9 show another modification wherein both the plate of the leg assembly and the longitudinal channel are altered. Here the channel 14a has the modified box channel along one edge comprising the flange 90 which extends normal to the wall 18 and has an oblique lip 92 defining an internal cam surface 94. The outer side edge of the channel 14a has the flange 96 also normal to the wall 18 and has pairs of space threaded bore holes to receive the set screws 66. This spacing is less than the length of the modified plate 50b which can be made of 12 gauge galvanized steel of the leg assembly 16b as shown in FIGS. 7 and 8. The plate 50b has the flange 98 along one edge, spaced somewhat from the leg column 24 and a similar flange 100 is provided adjacent the leg 24 on the other side against which the set screws impinge squarely. In this embodiment the flange 98 wedges into the box corner defined by the flanges 90 and 92 aided by the cam surface 94 and held in place by the set screw 66. The arrangement is used in installations where placement of the legs may be fixed by the location of the pairs of screws 66 and their bore holes in the flange 96 of the channel 14a. The relationship of the center line (vertical axis) of the leg 16 with the plate 50 can be varied from that shown in the drawings.

In FIG. 10 the leg plate 50 is provided with the flange 100 having the bore hole 102 engaged by the hexhead self-tapping cap screw 66 which passes through the bore hole 104 in the flange 96 of the channel 14. The other flanges of both the leg plate 50 and the channel 14 can be the same as shown in FIGS. 3, 6 and 9. The leg plate 50 is dimensioned so that when these other flanged or unflanged ends or edges such as the corner 70 of FIG. 3, the edge 80 of FIG. 6, and the depending flange 98 of FIG. 9, fit into the internal corner 21 of the channel, opposite the flange 96, the flange 100 is pivotable to a position just inside the flange 96 with the leg plate 50 and its top surface 52 against the surface 18 of the channel. In this embodiment as the cap screw 66 is tightened, the flanges 96 and 100 are drawn up flush with each other or in an otherwise engaging contact and the other flanges or edges are withdrawn slightly from their corner engagement. The flanges 20 and the combination flange 90–92 has sufficient retention to prevent the leg plate 50 from being dislodged from this position. During normal use the weight of the cabinet 10 also prevents dislodgement of the leg assembly. The arrangement disclosed in FIG. 10 and consequent reversal of the screw 66 can be used in the embodiments shown in FIGS. 3, 6 and 9.

For some installations it may be necessary to use only one cap screw 66 on the leg plate 50 or on the flange 96, since the corner 70 on the edge 84 automatically squares itself behind the flange 20. At least two properly spaced cap screws form a preferred construction, although more than two can be used.

What is claimed is:

1. A leg support assembly for cabinets and the like comprising:
    an elongated channel member secured on the underside of said cabinet;
    said channel member having a planar top wall and inwardly inclined depending edge flanges therealong defining camming surfaces along a downwardly facing channel opening that is narrower than said top wall;
    said edge flanges of said channel member defining opposing camming surfaces and opposing inside oblique acute angle corners along the junctures of the edge flanges with said top inside wall;
    a leg assembly having a tubular leg member with a planar top end plate affixed thereto;

said top end plate being wider than said tubular leg member and defining an opposite pair of edges of a greater width between them than the opening between the edge flanges of said channel member;

one of said edges of said top end plate being disposed within said channel opening engaging in the inside acute angle corner defined by one of said edge flanges within said channel opening;

the other of said edges of said top end plate having a depending flange therealong positioned in laterally spaced relationship from the other inside acute angle corner with said leg assembly having an overall width of less than the distance between one inside acute angle corner and the edge of said opening remote therefrom and further positioned with said top end plate flush against the top inside wall of said channel member; and adjustable locking means disposed at an acute angle to the camming surface of the other edge flange adjusted towards said other acute angle corner to lock said leg assembly within said channel opening.

2. A leg attachment in accordance with claim 1 in which:
said locking means comprises a pair of longitudinally spaced members threadably engaged through said depending flange of said top end plate with their ends camming against said other edge flange of said channel member to hold said top end plate in said flush position.

3. A leg attachment in accordance with claim 1 in which:
said depending flange on the one edge of said top plate extends in a plane subtending and inwardly spaced from the other acute angle corner of said channel member; and said locking means comprises a pair of longitudinally spaced members threadably engageable through said depending flange of said top end plate with their ends camming against said other edge flange of said channel member to hold said top end plate in said flush position against said top inside wall.

4. The leg attachment defined in claim 1 in which the depending flange of said top end plate defines with the top end plate an included obtuse angle and carries said lock means on an inclined axis at an acute angle with respect to the camming surface of said other edge flange.

* * * * *